US009165247B2

(12) United States Patent
Cantin

(10) Patent No.: US 9,165,247 B2
(45) Date of Patent: *Oct. 20, 2015

(54) USING GLOBAL AND LOCAL CATASTROPHES ACROSS SUB-POPULATIONS IN PARALLEL EVOLUTIONARY COMPUTING

(75) Inventor: Jason F. Cantin, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 591 days.

This patent is subject to a terminal disclaimer.

(21) Appl. No.: 13/343,558

(22) Filed: Jan. 4, 2012

(65) Prior Publication Data
US 2013/0173511 A1 Jul. 4, 2013

(51) Int. Cl.
G06N 3/12 (2006.01)

(52) U.S. Cl.
CPC ........................................ G06N 3/12 (2013.01)

(58) Field of Classification Search
USPC .......................................................... 706/13
See application file for complete search history.

(56) References Cited

U.S. PATENT DOCUMENTS

| 5,343,554 | A | 8/1994 | Koza et al. |
| 5,363,098 | A | 11/1994 | Antoshenkov |
| 5,390,283 | A | 2/1995 | Eshelman et al. |
| 5,443,076 | A | 8/1995 | Bau |
| 5,651,099 | A | 7/1997 | Konsella |
| 5,742,738 | A | 4/1998 | Koza et al. |
| 5,857,196 | A | 1/1999 | Angle et al. |
| 5,946,674 | A | 8/1999 | Nordin et al. |
| 6,031,935 | A | 2/2000 | Kimmel |
| 6,057,424 | A | 5/2000 | Vail |
| 6,058,385 | A | 5/2000 | Koza et al. |
| 6,128,607 | A | 10/2000 | Nordin et al. |

(Continued)

FOREIGN PATENT DOCUMENTS

| WO | 9963997 | 12/1999 |
| WO | 0067186 | 9/2001 |

(Continued)

OTHER PUBLICATIONS

Skolicki, Zbigniew, and Kenneth De Jong. "The influence of migration sizes and intervals on island models." Proceedings of the 2005 conference on Genetic and evolutionary computation. ACM, 2005.*

(Continued)

Primary Examiner — Kakali Chaki
Assistant Examiner — Kevin W Figueroa
(74) Attorney, Agent, or Firm — DeLizio Law, PLLC

(57) ABSTRACT

A parallel genetic algorithm computing process tracks forward progress of a first sub-population across generations thereof. The first sub-population is one of a plurality of sub-populations that form a population of candidate solutions to an optimization problem. At a current generation of the first sub-population, it is determined that forward progress of the first sub-population fails a set of one or more forward progress criteria. In response to determining that the forward progress of the first sub-population fails the set of one or more forward progress criteria at the current generation, a local catastrophe is invoked on the current generation of the first sub-population. The first sub-population is re-populated after the local catastrophe is invoked. The first sub-population is re-established after re-populating while constraining migration to the first sub-population.

13 Claims, 10 Drawing Sheets

(56) References Cited

U.S. PATENT DOCUMENTS

| | | | |
|---|---|---|---|
| 6,260,031 | B1 | 7/2001 | Schaffer et al. |
| 6,442,582 | B1 | 8/2002 | Hale |
| 6,532,076 | B1 | 3/2003 | Sidorowich |
| 6,532,453 | B1 | 3/2003 | Koza et al. |
| 6,539,366 | B1 | 3/2003 | Doyle et al. |
| 6,553,357 | B2 | 4/2003 | Mathias et al. |
| 6,691,285 | B1 | 2/2004 | Burden et al. |
| 6,725,326 | B1 | 4/2004 | Patra et al. |
| 6,882,989 | B2 | 4/2005 | Stevens |
| 7,031,887 | B2 | 4/2006 | Jain et al. |
| 7,043,463 | B2 | 5/2006 | Bonabeau et al. |
| 7,045,674 | B2 | 5/2006 | Davisson |
| 7,191,168 | B1 | 3/2007 | Buchsbaum et al. |
| 7,313,666 | B1 | 12/2007 | De Silva et al. |
| 7,383,235 | B1 | 6/2008 | Ulyanov et al. |
| 7,451,121 | B2 | 11/2008 | Wu et al. |
| 7,469,237 | B2 | 12/2008 | Cooper |
| 7,514,407 | B2 | 4/2009 | Averback |
| 7,560,248 | B1 | 7/2009 | Raines |
| 7,603,326 | B2 | 10/2009 | Bonabeau et al. |
| 7,937,569 | B1 | 5/2011 | Sander et al. |
| 8,489,526 | B2 | 7/2013 | Cantin |
| 2002/0016782 | A1 | 2/2002 | Cooper |
| 2002/0019975 | A1 | 2/2002 | Johnson |
| 2002/0120407 | A1 | 8/2002 | Stevens |
| 2002/0183510 | A1 | 12/2002 | Vail |
| 2003/0028578 | A1 | 2/2003 | Jain et al. |
| 2003/0055614 | A1 | 3/2003 | Pelikan et al. |
| 2004/0002460 | A1 | 1/2004 | Averback |
| 2004/0008883 | A1 | 1/2004 | Shi et al. |
| 2004/0010479 | A1 | 1/2004 | Ali |
| 2004/0024750 | A1 | 2/2004 | Ulyanov et al. |
| 2004/0029809 | A1 | 2/2004 | Averback |
| 2004/0044633 | A1 | 3/2004 | Chen |
| 2004/0133929 | A1 | 7/2004 | Davisson |
| 2004/0143559 | A1* | 7/2004 | Ayala .............................. 706/13 |
| 2004/0210545 | A1* | 10/2004 | Branke et al. .................. 706/45 |
| 2004/0254901 | A1 | 12/2004 | Bonabeau et al. |
| 2005/0044052 | A1 | 2/2005 | Zhu |
| 2005/0159897 | A1 | 7/2005 | Anderson et al. |
| 2005/0197978 | A1 | 9/2005 | Anderson et al. |
| 2005/0197979 | A1 | 9/2005 | Anderson et al. |
| 2006/0195204 | A1 | 8/2006 | Bonabeau et al. |
| 2007/0116267 | A1 | 5/2007 | Speirs et al. |
| 2007/0172828 | A1 | 7/2007 | Schaffer et al. |
| 2008/0103995 | A1 | 5/2008 | Mohamed et al. |
| 2009/0150080 | A1 | 6/2009 | Dawkins et al. |
| 2009/0252718 | A1 | 10/2009 | Jeyaseelan et al. |
| 2009/0292180 | A1 | 11/2009 | Mirow |
| 2010/0113397 | A1 | 5/2010 | Wong et al. |
| 2012/0130929 | A1 | 5/2012 | Cantin |
| 2013/0006901 | A1 | 1/2013 | Cantin |
| 2013/0006902 | A1 | 1/2013 | Cantin |
| 2013/0173512 | A1 | 7/2013 | Cantin |
| 2013/0275351 | A1 | 10/2013 | Cantin |

FOREIGN PATENT DOCUMENTS

| | | |
|---|---|---|
| WO | 03074558 | 9/2003 |
| WO | 2004104029 | 12/2004 |
| WO | 2005078629 | 8/2005 |
| WO | 2006135345 | 12/2006 |
| WO | 2007123923 | 11/2007 |

OTHER PUBLICATIONS

"U.S. Appl. No. 13/174,441 Office Action", Jun. 5, 2013, 30 pages.
Jin, Yaochu et al., "Fitness A.pproxhnation in Evolutionary Computation—.A Survey", Proceedings of the Genetic and Evolutionary Computation Conference Email: yaochu.jin@de.hrdeu.com 2002, pp. 1105-1112.
Mitrevski, P. et al., "Prediction and Speculation Techniques in ILP", 22nd Int. Conf. Information Technology Interfaces ITI2000 pece. mitrevski@uklo.edu.mk; (marjan, infolab)@prof.ukim.edu.mk Jun. 2000, pp. 67-72.
Welten, Samuel, "Parallelization of Evolutionary Algorithms", Swiss Federal Institute of Technology Zurich, Systems Optimization Group—Thesis Spring 2008, pp. 1-51.
"U.S. Appl. No. 12/954,296 Restriction Requirement", Nov. 29, 2012, 6 pages.
Ergezer, Mehmet et al., "Oppositional Biogeography-Based Optimization", IEEE publication m.ergezer@csuohio.edu 2009, pp. 1009-1014.
Rahnamayan, et al., "Opposition-Based Differential Evolution (ODE) with Variable Jumping Rate", IEEE publication shahryar@pami.uwaterloo.ca, tizhoosh@uwaterloo.ca, m.salama@ece.uwaterloo.ca 2007, pp. 81-88.
U.S. Appl. No. 13/916,301, filed Jun. 12, 2013, Cantin, Jason F.
U.S. Appl. No. 12/948,850, filed Nov. 18, 2010, Bell, Jr., Robert H., et al.
U.S. Appl. No. 12/954,296, filed Nov. 24, 2010, Cantin, Jason F.
U.S. Appl. No. 13/174,441, filed Jun. 30, 2011, Cantin, Jason F.
"U.S. Appl. No. 13/592,851 Office Action", Jun. 17, 2013, 37 pages.
"Crossover and Mutation", http://www.obitko.com/tutorials/genetic-algorithms/crossover-mutation.php Marek Obitko, 1998 1998, 1 page.
"Plug-and-Play Macroscopes", Communications of the ACM vol. 54, Issue No. 3 Mar. 2011, 116 pages.
Affenzeller, Michael et al., "Genetic Algorithms and Genetic Programming: Modern Concepts and Practical Applications", CRC Press, 2009 http://www.crcpress.com/product/isbn/9781584886297 Apr. 9, 2009, pp. 138-139.
Alba, Enrique et al., "Influence of the Migration Policy in Parallel Distributed GAs with Structured and Panmictic Populations", Applied Intelligence vol. 12 Issue 3, May-Jun. 2000, 163-181.
Baluja, Shumeet, "Genetic Algorithms and Explicit Search Statistics", Justsystem Pittsburgh Research Center & School of Computer Science, Carnegie Mellon University 1997, 7 pages.
Bright, Marc et al., "An Efficient Random Number Generation Architecture for Hardware Parallel Genetic Algorithms", Lecture Notes in Computer Science; vol. 1917, ISBN:3-540-41056-2 Publisher: Springer-Verlag 2000, pp. 583-588.
Colton, Simon, "Lecture 16 Genetic Algorithms", http://www.doc.ic.ac.uk/~sgc/teaching/v231/lecture16.html 2004, 8 pages.
Dubrovsky, Opher et al., "A Genetic Algorithm with a Compact Solution Encoding for the Container Ship Stowage Problem", Journal of Heuristics, vol. 8, Issue 6, ISSN:1381-1231 http://portal.acm.org/citation.cfm?id=594958.595104&coll=GUIDE&dl=GUIDE&CFID=91858704&CFTOKEN=76504727 Nov. 2002, pp. 585-599.
Gong, Yiyuan et al., "Parallel Genetic Algorithms on Line Topology of Heterogeneous Computing Resources", GECCO '05 Proceedings of the 2005 conference on Genetic and evolutionary computation 2005, pp. 1447-1454.
Greenwell, R.N. et al., "Optimal Mutation Probability for Genetic Algorithms", Mathematical and Computer Modelling vol. 21, No. 8, http://www.ingentaconnect.com/content/els/08957177/1995/00000021/00000008/art00035 Apr. 1995, pp. 1-11.
Kargupta, Hillol, "Search, Polynomial Complexity, and the Fast Messy Genetic Algorithm", Illigal Report No. 95008 Oct. 1995, 202 pages.
Nowostawski, Mariusz et al., "Dynamic Demes Parallel Genetic Algorithm", May 13, 1999, 6 pages.
Ochoa, Gabriela et al., "Optimal Mutation Rates and Selection Pressure in Genetic Algorithms", Proceedings of the Genetic and Evolutionary Computation Conference (GECCO'00) Jul. 8-12, 2000, 8 pages.
Pal, Sankar K. et al., "Genetic algorithms for pattern recognition", CRC Press, http://www.crcpress.com/product/isbn/9780849394676;jsessionid=RF4KzIIhxMO3zF3u8Z8sRQ** 1996, pp. 69-72.
Reeves, Colin, "Kluwewer's International Series—Handbook of Metaheuristics", WebSite Link: http://sci2s.ugr.es/docencia/algoritmica/GeneticAlgorithms.pdf Chapter 3, School of Mathematical and Information Sciences, http://www.mis.coventry.ac.uk/~colinr/ 2003, 28 pages.

(56) References Cited

OTHER PUBLICATIONS

Sen, Ouyang, "An Improved Catastrophic Genetic Algorithm and Its Application in Reactive Power Optimization", http://www.SciRP.org/journal/epe Novemeber 2010, pp. 306-312.

Vertanen, Keith, "Genetic Adventures in Parallel: Towards a Good Island Model under PVM", 1998, 12 pages.

Xin-Rong, Liu et al., "Application of Catastrophic Adaptive Genetic Algorithm to Reactive Power Optimization of Power System", Artificial Intelligence and Computational Intelligence (AICI), 2010 International Conference Oct. 23-24, 2010, 2 pages.

Yu, Wen et al., "A Catastrophe Based-Parallel Genetic Algorithm", Systems Engineering Institute of Xi'an Jiaotong University, Xi'an710049) Jul. 2001, 4 pages.

U.S. Appl. No. 13/592,851, filed Aug. 23, 2012, Cantin, Jason F.

U.S. Appl. No. 13/593,850, filed Aug. 24, 2012, Cantin, Jason F.

"U.S. Appl. No. 13/174,441 Final Office Action", Nov. 21, 2013, 30 Pages.

"U.S. Appl. No. 13/592,851 Final Office Action", Nov. 20, 2013, 20 pages.

"U.S. Appl. No. 13/916,301 Non Final Office Action", Jan. 15, 2014, 8 pages.

\* cited by examiner

USING GLOBAL AND LOCAL CATASTROPHES ACROSS SUB-POPULATIONS IN PARALLEL EVOLUTIONARY COMPUTING

BACKGROUND

Embodiments of the inventive subject matter generally relate to the field of evolutionary computing, and, more particularly, to using local and global catastrophes in evolutionary computing.

Software tools employ metaheuristic optimization algorithms to solve optimization problems. Examples of metaheuristic optimization algorithms include evolutionary algorithms (e.g., genetic algorithm, differential evolution), ant colony optimization algorithms, simulated annealing algorithms, etc.

Evolutionary algorithms use techniques loosely based on Darwinian evolution and biological mechanisms to evolve solutions to design problems. A software tool that implements an evolutionary algorithm starts with a randomly generated population of solutions, and iteratively uses sexual recombination, crossover, mutation, and the Darwinian principles of natural selection to create new, more fit solutions in successive generations. Evolutionary algorithms have been deployed in many aspects of research and development, and have generated human-competitive solutions to a wide range of problems. Within International Business Machines Corporation (IBM), (SNAP) has been successfully applied to I/O circuit design for Power?/7+, scan-chain routing, the high performance computing (HPC) bidding process, signal integrity for z-series buses, and compiler flag tuning.

An executing instance of an evolutionary algorithm can prematurely converge. A population of candidate solutions converges when the genes of a few fit candidate solutions quickly dominate the population, and constrain the population to a local optimum. Premature convergence means that the population of candidate solutions for an optimization problem has converged too early, thus delivering a suboptimal result.

SUMMARY

Embodiments of the inventive subject matter also include a computer program product for invoking a local catastrophe on a sub-population in a parallel evolutionary algorithm computing process. The computer program product comprises a computer readable storage medium having computer usable program code embodied therewith. The computer usable program code comprises a computer usable program code configured to track forward progress of a population of candidate solutions across generations thereof. The population is divided into a plurality of sub-populations across a plurality of computing entities that iteratively create new generations of the plurality of sub-populations of candidate solutions in search of a solution to an optimization problem. The computer usable program code is configured to track local catastrophes invoked on the plurality of computing entities by the plurality of computing entities. At a current generation of the population, the computer usable program code is configured to determine that forward progress of the population fails a set of one or more forward progress criteria. In response to a determination that the forward progress of the population fails the set of one or more forward progress criteria at the current generation, the computer usable program code is configured to select parameter values that influence the global catastrophe. The selection is based, at least in part, on forward progress of the local catastrophes. The computer usable program code is configured to command the plurality of computing entities to collectively apply a global catastrophe to the plurality of sub-populations in accordance with the parameter values.

BRIEF DESCRIPTION OF THE DRAWINGS

The present embodiments may be better understood, and numerous objects, features, and advantages made apparent to those skilled in the art by referencing the accompanying drawings.

FIG. 5 depicts a flowchart of example operations that continue from FIG. 4. FIG. 6 depicts a flowchart of example operations that continue from FIG. 5.

FIG. 7 depicts a flowchart of example operations for invoking a global catastrophe when average fitness and best fitness of a population do not progress. FIG. 8 depicts a flowchart of example operations that continue from block 721 of FIG. 7. FIG. 9 depicts a flowchart of example operations that continue from FIG. 7.

DESCRIPTION OF EMBODIMENT(S)

Figure 1:
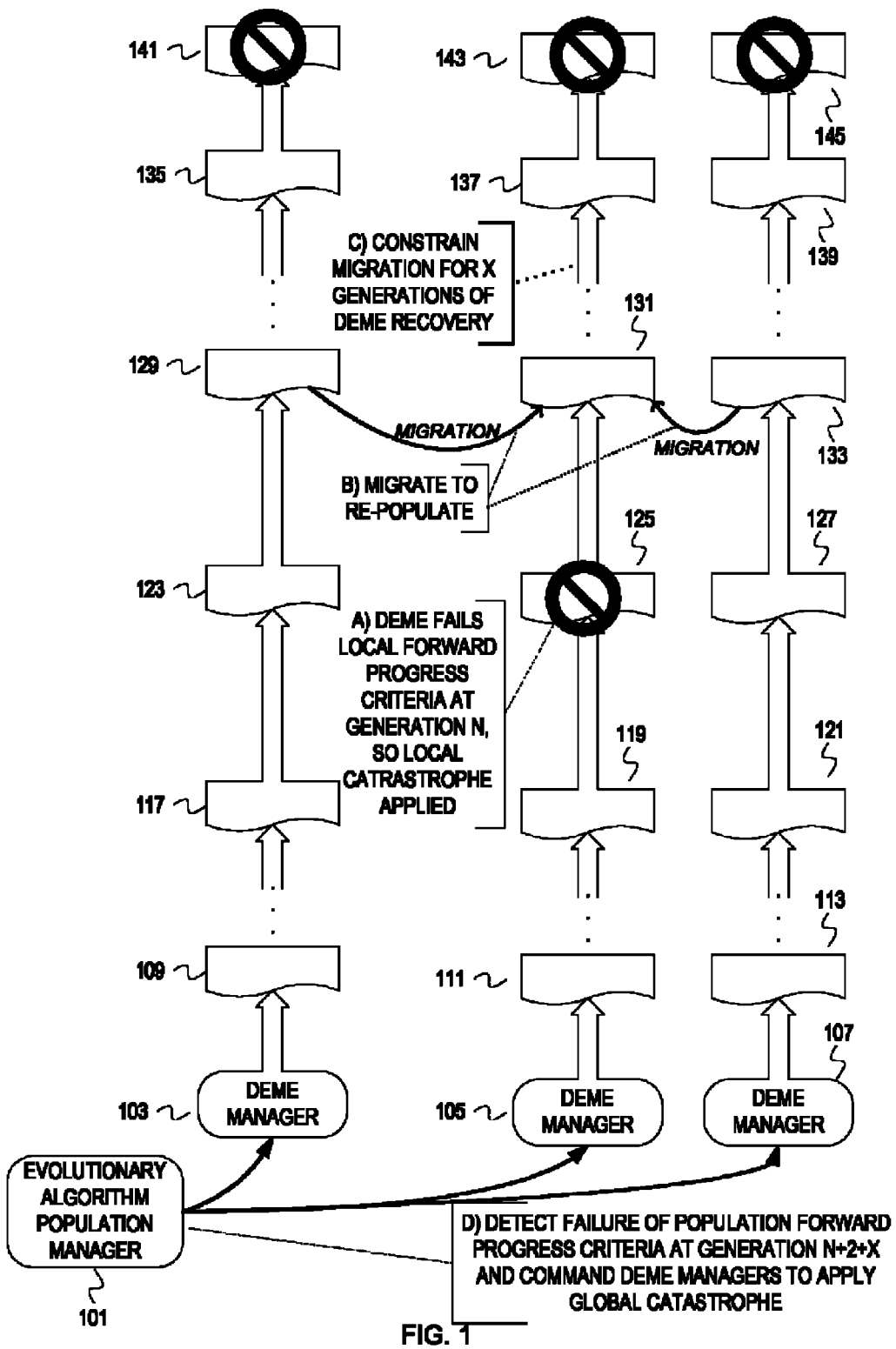
FIG. 1 depicts an example conceptual diagram of a local catastrophe within a single sub-population and a global catastrophe across the population at a later generation.

The description that follows includes exemplary systems, methods, techniques, instruction sequences and computer program products that embody techniques of the present inventive subject matter. However, it is understood that the described embodiments may be practiced without these specific details. For instance, although examples refer to machines, embodiments of the inventive subject matter can be implemented in a virtualization environment. For example, sub-populations can be assigned to different virtual machines that can be supported by a single machine. As another example, sub-populations can be assigned to different cores in a multi-core environment. In other instances, well-known instruction instances, protocols, structures and techniques have not been shown in detail in order not to obfuscate the description.

Terminology

Literature about evolutionary computing uses a large variety of terminology. In some cases, terms are used ambiguously. Genetic algorithm literature sometimes uses the terms "population" and "generation" ambiguously. A software tool or computer program that implements an evolutionary algorithm to solve an optimization problem iteratively creates candidate solutions, computes fitness values for the candidate solutions, and evaluates the candidate solutions to determine whether a next iteration should begin. The candidate solutions created at a particular iteration are referred to as a generation of candidate solutions or generation, a population of candidate solutions, or a population of candidates solutions of a generation. A population of candidate solutions can also be separated into demes or sub-populations. When separated into sub-populations, the term "generation" typically refers to all of the sub-populations in that generation. The specification will sometimes use the term "sub-population generation" to refer to a generation of one of the sub-populations. The term "population" also refers to the aggregate of candidate solutions across generations. Similarly, the term "sub-population" refers to the aggregate of candidate solutions managed by a deme manager across generations. The specification will also use the term "iteration." Iteration is used to refer to a stage in the computing process, instead of generation. The term "process" is often used to refer to an instantiation of a sequence of machine-readable program instructions. The term "evolutionary computing process" refers to the aggregate work performed by computing resource units or nodes for a run of a tool or program that implements an evolutionary algorithm. The term "evolutionary computing process" is not limited to a single instance of executing instructions. The term "node" or "computing node" is used herein to refer to a computing resource unit. Examples of a node include a computer, a mobile device, a virtual machine, a core in a multi-core environment, a processor in a multi-processor environment, a group of computers in a cluster, a group of computers in a grid, etc.

Overview

A software tool that implements an evolutionary algorithm across multiple nodes (e.g., multiple cores, multiple machines, etc.) can comprise a population manager and a sub-population manager when an evolutionary algorithm is applied to a population of candidate solutions that is separated into sub-populations of candidates solutions. The population manager assigns the sub-populations to different nodes, on which sub-population managers run. A sub-population manager performs biological operations to propagate the corresponding sub-population, and computes the fitness metric values of the sub-population. The sub-population managers communicate the fitness metric values for their sub-populations to the population manager. The population manager evaluates the fitness metric values to determine whether a generation of the population satisfies a set of one or more termination criteria. The sub-population managers also implement migration of candidate solutions between sub-populations in accordance with migration parameters communicated by the population manager and/or as directed by the population manager.

The population manager and sub-population managers implement local and global catastrophe procedures or mechanisms to avoid premature convergence, or to restore diversity responsive to detected or suspected premature convergence. A sub-population manager may detect or anticipate premature convergence within a sub-population of candidate solutions. One or more criteria can be configured to represent a condition corresponding to premature convergence or anticipated premature convergence. This description refers to the one or more criteria as forward progress criteria. The forward progress criteria can be different between sub-populations, and can be different for the population than the sub-populations. If a sub-population fails to satisfy local forward progress criteria, then the sub-population manager applies or invokes a local catastrophe procedure on the sub-population. With the exception of one or more survivor candidate solutions, if any, the sub-population manager restores the sub-population with migration and/or mutation. While the sub-population recovers from the catastrophe, the other sub-populations continue through successive generations, assuming they do not also fail to make forward progress. The population manager can also determine that the aggregate of the sub-populations (i.e., the population of candidate solutions) fails forward progress criteria for the population ("global forward progress criteria"). If the population fails the global forward progress criteria, then the population manager commands the sub-population managers to invoke a global catastrophe procedure across the sub-populations.

FIG. 1 depicts an example conceptual diagram of a local catastrophe within a single sub-population and a global catastrophe across the population at a later generation. FIG. 1 depicts an evolutionary algorithm population manager 101, deme manager 103, deme manager 105, and deme manager 107. The managers are program running on nodes. The deme managers 103, 105, 107 may operate at different rates, thus their corresponding sub-populations can evolve asynchronously. In that case, the population manager 101 tracks progress of the deme managers 103, 105, 107. FIG. 1 depicts the deme managers 103, 105, 107 generating several generations of sub-populations.

The deme manager 103 generates an initial sub-population 109. The deme manager 103 generates several other generations of the sub-population until the sub-population is established with a sub-population generation 117. Likewise, the deme managers 105,107 establish their sub-populations. The deme manager 105 generates an initial sub-population 111, and the deme manager 107 generates an initial sub-population 113. The deme managers 105, 107 generate several other generations of their sub-populations until the sub-populations are established with sub-population 119 and sub-population 121, respectively.

At generation N, the deme manager 103 and the deme manager 107 respectively generate a sub-population 123 and a sub-population 127. The deme manager 105 generates a sub-population 125. At a stage A, the deme manager 105 determines that the sub-population 125 (or deme) of generation N fails the local forward progress criteria. The deme manager 105 applies a catastrophe procedure to the sub-population 125 of generation N. The deme manager 105 selects a survivor(s) to carry into generation N+1.

At a stage B, the deme manager 105 generates a sub-population 131 of generation N+1 via migration. Copies of candidate solutions migrate from the neighboring sub-populations to re-populate after the catastrophe. Some embodiments can use mutation in addition or instead of migration to restore the sub-population. Some embodiments generate random candidate solutions to recover from a catastrophe. The deme manager 103 generates a sub-population 129 of generation N+1 and the deme manager 107 generates a sub-population 133 of generation N+1. FIG. 1 depicts migration from the sub-populations 129, 133, but migration can be from earlier generations, or even later generations of neighbors.

At a stage C, the deme manager 105 constrains migration for X generations of deme recovery. The deme manager 105 uses biological operations to iteratively generate sub-populations while constraining migration until arriving at generation N+1+X, and generating a sub-population 137. The deme manager can constrain migration to different degrees. The deme manager 105 can prevent migration until after generation N+1+X, can allow limited migration until generation N+1+X, and can change the degree of migration allowed as recovery progresses. The deme manger 105 can base recovery progress on generation and/or fitness metric values. The deme managers 103, 107 continue evolving their sub-populations of candidate solutions as long as they continue to satisfy their local forward progress criteria. In generation N+1+X, the deme manager 103 generates a sub-population 135 and the deme manager 107 generates a sub-population 139.

In generation N+2+X, the deme manager 103 generates a sub-population 141 and the deme manager 107 generates a sub-population 145. The deme manager 105 has recovered from the local catastrophe, and generates a sub-population 143 of the generation N+2+X.

At a stage D, the population manager 101 determines that the population of candidate solutions fails global forward progress criteria in generation N+2+X. In response to the failure, the population manager 101 commands the deme managers 103, 105, 107 to apply a global catastrophe. The deme managers 103, 105, 107 respectively apply global catastrophe procedures to the sub-populations 141, 143, 145. The deme managers 103, 105, 107 select a survivor(s), if any, from their respective sub-populations 141, 143, 145. The deme managers 103, 105, 107 use mutation operations to recover from the global catastrophe.

Figure 2:
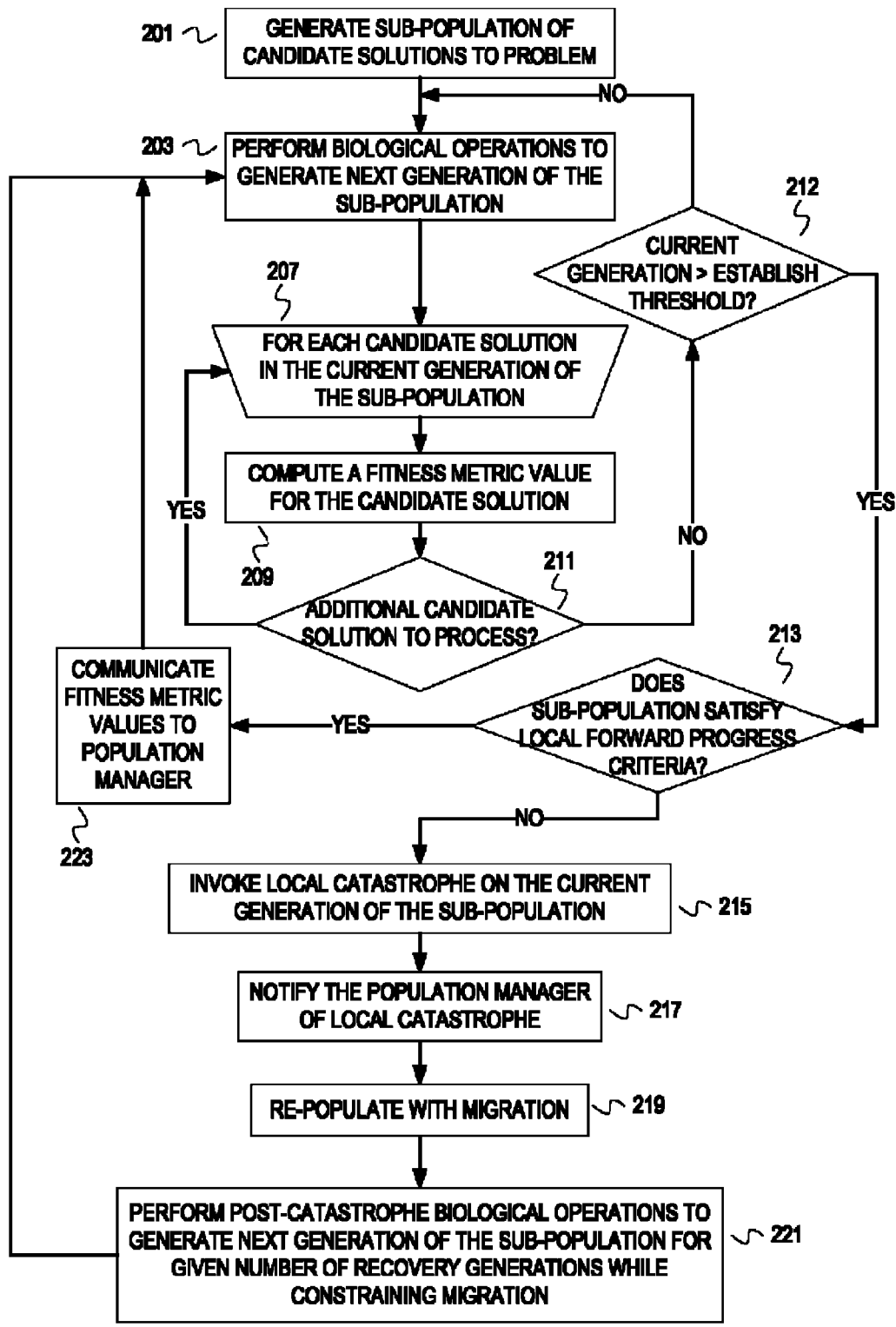
FIG. 2 depicts a flowchart of example operations for invoking a local catastrophe when local forward progress criteria are not satisfied.

FIG. 2 depicts a flowchart of example operations for invoking a local catastrophe when local forward progress criteria are not satisfied. Initially, a deme manager will iteratively generate multiple generations of candidate solutions to establish a stable or sufficiently fit sub-population. Embodiments can establish the sub-population differently. An embodiment can compute and record fitness metric values of each generation of the sub-population, or wait to begin recording and/or communicating computed fitness metric values for X generations based on an assumption that the sub-population will not be stable or sufficiently fit for X generations. The example operations depicted at blocks 201, 203, and 205 in FIG. 2 presume an embodiment that does not compute fitness of the early sub-population generations.

At block 201, a deme manager generates a sub-population of candidate solutions to an optimization problem. The deme manager can generate this generation 0 sub-population of candidate solutions with randomly generated candidate solutions, seed candidate solutions, a combination of seed candidate solutions and randomly generated candidate solutions. In addition, a population manager can provide an initial sub-population generation, or even multiple early sub-population generations, to the deme manager.

At block 203, the deme manager performs biological operations to generate a next generation of the sub-population.

At block 207, a loop of operations begins for each candidate solution in the current sub-population generation. An initial candidate solution is selected from the sub-population. The loop in FIG. 2 includes the operations depicted in block 209.

At block 209, the deme manager computes a fitness metric value for the candidate solution. The deme manager stores the computed fitness metric value with an indication of the candidate solution and the generation.

At block 211, the deme manager determines whether another candidate solution remains to be processed (i.e., loop termination check is performed). If there is an additional candidate solution to be processed, then control flows back to block 207 for selection of the next candidate solution. Otherwise, control flows to block 212.

At block 212, the deme manager determines whether the current sub-population generation exceeds a establish threshold. A threshold number of generations for establishing a sub-population can be configured. For instance, the deme manager determines whether 7 generations have been created, if the threshold has been configured as 7. In some embodiments, the establish threshold corresponds to fitness of the sub-population. For instance, the deme manager determines whether an average fitness of the sub-population and/or a best fitness metric value of the sub-population exceeds a fitness based establish threshold. In some embodiments, multiple establish threshold criteria can be employed (e.g., a fitness based establish threshold unless a generation reaches a generation based establish threshold ceiling). If the sub-population is not established, then control returns to block 203. If the sub-population is established, then control flows to block 213.

At block 213, the deme manager determines whether the sub-population generation satisfies local forward progress criteria. The deme manager determines whether the fitness metric values of the sub-population generation indicate progress or stagnation. Different techniques for determining forward progress will be discussed in more detail with respect to FIGS. 4-6. If the sub-population generation does not satisfy the forward progress criteria, then control flows to block 215. If the sub-population generation is progressing forward, then control flows to block 223.

At block 223, the deme manager communicates the fitness metric values of the sub-population generation to the population manager. The deme manager may write to a network location accessible by the population manager and/or transmit message that encode the fitness metric values to the population manager. The deme manager also indicates the generation and the sub-population for the fitness metric values. Control flows from block 223 back to block 203. In some embodiments, the deme manager waits for an indication to proceed from the population manager before creating the next generation.

If the sub-population generation failed to satisfy the local forward progress criteria at block 213, then the deme manager invokes a local catastrophe on the current sub-population generation at block 215. The deme manager invokes a function or procedure that eliminates at least a majority of the sub-population. The local catastrophe procedure may select one or more survivor candidate solutions, and then eliminate all other candidate solutions. The local catastrophe procedure may not select any survivors. A survivor quantity parameter that specifies number of survivor candidate solutions can be configured. An embodiment can define the survivor quantity for the duration of a run, and change across multiple runs depending on results of prior runs. An embodiment can adapt the survivor parameter based on various other factors that can include number of preceding local catastrophes and/or global catastrophes, generation (e.g., a number of survivors is greater if forward progress fails at a later generation), fitness of the sub-population relative to other sub-populations, etc. A local catastrophe procedure may default to selecting the most fit candidate solutions to survive a local catastrophe. But a deme manager can also employ another parameter(s) to influence selection of the one or more survivors ("survivor characteristic parameter"). The survivor characteristic parameter can indicate that a most fit and least fit candidate solutions are to be selected for diversity.

At block 217, the deme manager notifies the population manager of the local catastrophe.

At block 219, the deme manager re-populates with migration. The deme manager copies candidate solutions from neighboring demes to re-populate with any survivors. An embodiment can configure a recovery process to select migrant candidate solutions based on various recovery parameters. In some embodiments, the recovery process selects the most fit candidate solutions for migration. In some embodiments, a mixture of most fit, least fit, and moderately fit candidate solutions can be selected from neighboring sub-populations. A recovery process can also randomly select migrant candidate solutions. Embodiments are not necessarily limited to selecting migrants from a same generation. If demes progress asynchronously, the recovery process can select from candidate solutions of a neighboring deme that is in a later generation, or perhaps earlier generation. In addition, embodiments are not limited to migration for recovery. Embodiments can re-populate with survivors and mutations of survivors, can mutate candidate solutions not selected to survive, can mutate migrant candidate solutions, and can employ any combination of these techniques to recover from a local catastrophe.

At block 221, the deme manager performs post-catastrophe biological operations to generate a next generation of the sub-population for a given number of recovery generations. While the deme manager recovers from the local catastrophe, migration is constrained. Embodiments can constrain migration differently. An embodiment can allow migration from the recovering sub-population, but not into the recovering sub-population. An embodiment can prevent migration into the recovering sub-population for the entire recovery period, or can gradually relieve constraints on migration as the recovery nears conclusion. An embodiment may allow the initial migration and a subsequent migration of candidate solutions, depending on whether the migrant candidate solutions will dominate the recovering sub-population. Once the recovery is complete, control flows back to block 203.

Figure 3:
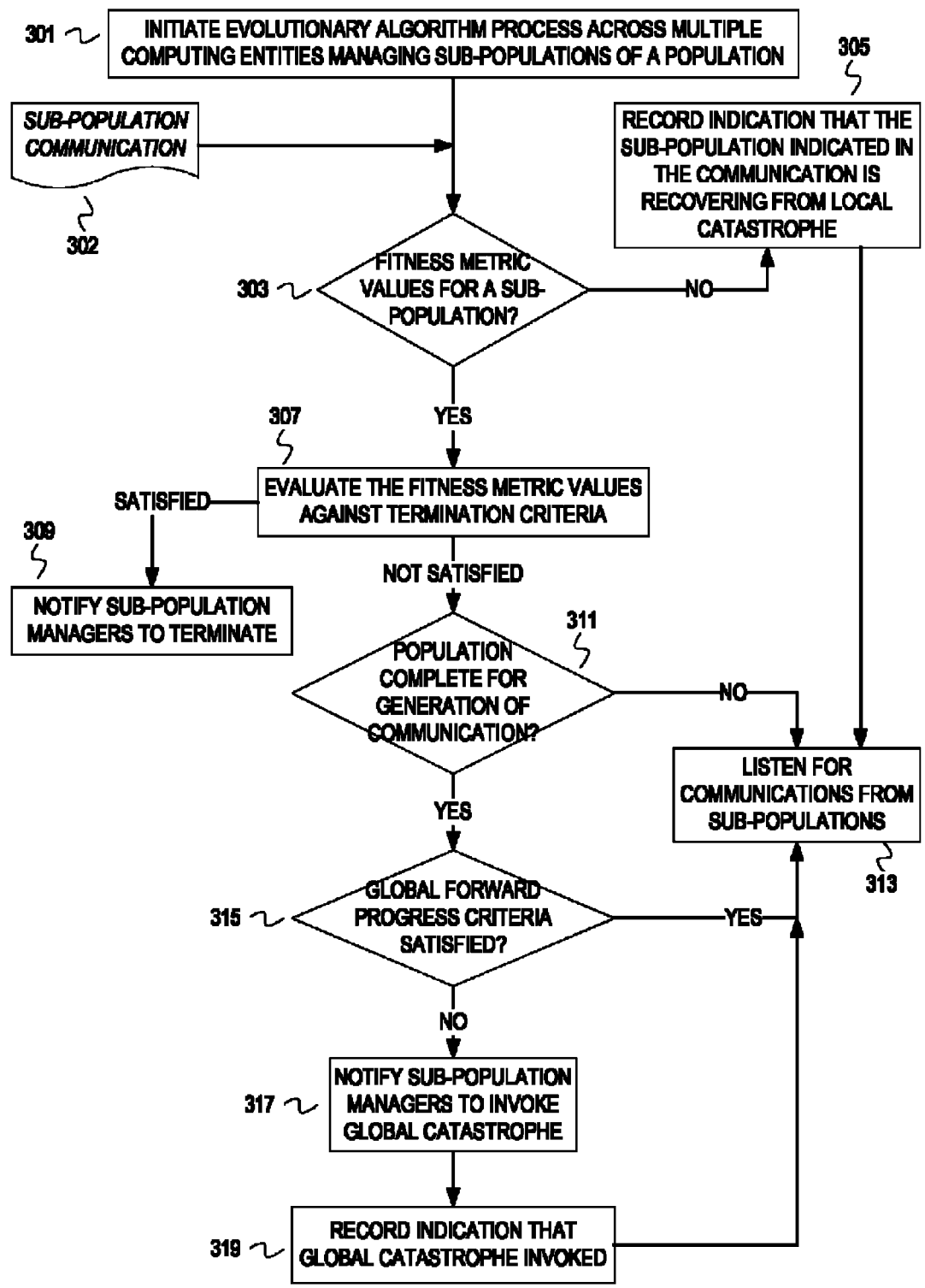
FIG. 3 depicts a flowchart of example operations for invoking a global catastrophe when global forward progress criteria are not satisfied.

FIG. 3 depicts a flowchart of example operations for invoking a global catastrophe when global forward progress criteria are not satisfied. The example operations depicted in FIG. 3 presume a population of candidate solutions are separated into sub-populations and distributed across multiple computing entities. With distributed sub-populations, a population manager tracks progress of the population (i.e., all of the sub-populations).

At block 301, a population manager initiates an evolutionary algorithm process for a population across multiple computing entities managing different sub-populations of the population. At some point after initiating the process, the population manager receives a sub-population communication 302 from a deme manager.

At block 303, the population manager determines whether the sub-population communication 302 is reporting fitness metric values for a sub-population. If the communication 302 is not reporting fitness metric values, then control flows to block 305 for processing the communication 302 as a notification that the deme manager has invoked a local catastrophe. If the communication 302 is reporting fitness metric values, then control flows to block 307.

At block 305, the population manager records an indication that the sub-population corresponding to the communication 302 is recovering from a local catastrophe. Now that the population manager is aware of the local catastrophe, the population manager can operate accordingly. For instance, the population manager may postpone a global catastrophe. The population manager may mark a log of fitness metric values to reflect the local catastrophe. The population manager may postpone notifying deme managers of termination until the recovering sub-population can be evaluated. Control flow from block 305 to block 313.

At block 313, the population manager listens for communications from sub-populations (i.e., deme managers).

If the communication 302 was reporting fitness metric values, then the population manager evaluates the fitness metric values against termination criteria at block 307. If the fitness metric values satisfy the termination criteria, then control flows to block 309. If the fitness metric values do not satisfy the termination criteria, then control flows to block 311.

At block 309, the population manager notifies the sub-population managers to terminate.

At block 311, the population manager determines whether the population is complete for the generation of the sub-population corresponding to the communication 302. In other words, the population manager determines whether all other sub-populations in generation N (assuming the communication 302 indicates generation N) have reported their fitness metric values. If the population for the generation indicated in the communication 302 is complete, then control flows to block 315. Otherwise, control flows to block 313.

At block 315, the population manager determines whether global forward progress criteria are satisfied by the population. If the global forward progress criteria are not satisfied, then control flows to block 317. If global forward progress criteria are satisfied by the population, then control flows to block 313.

Figure 7:
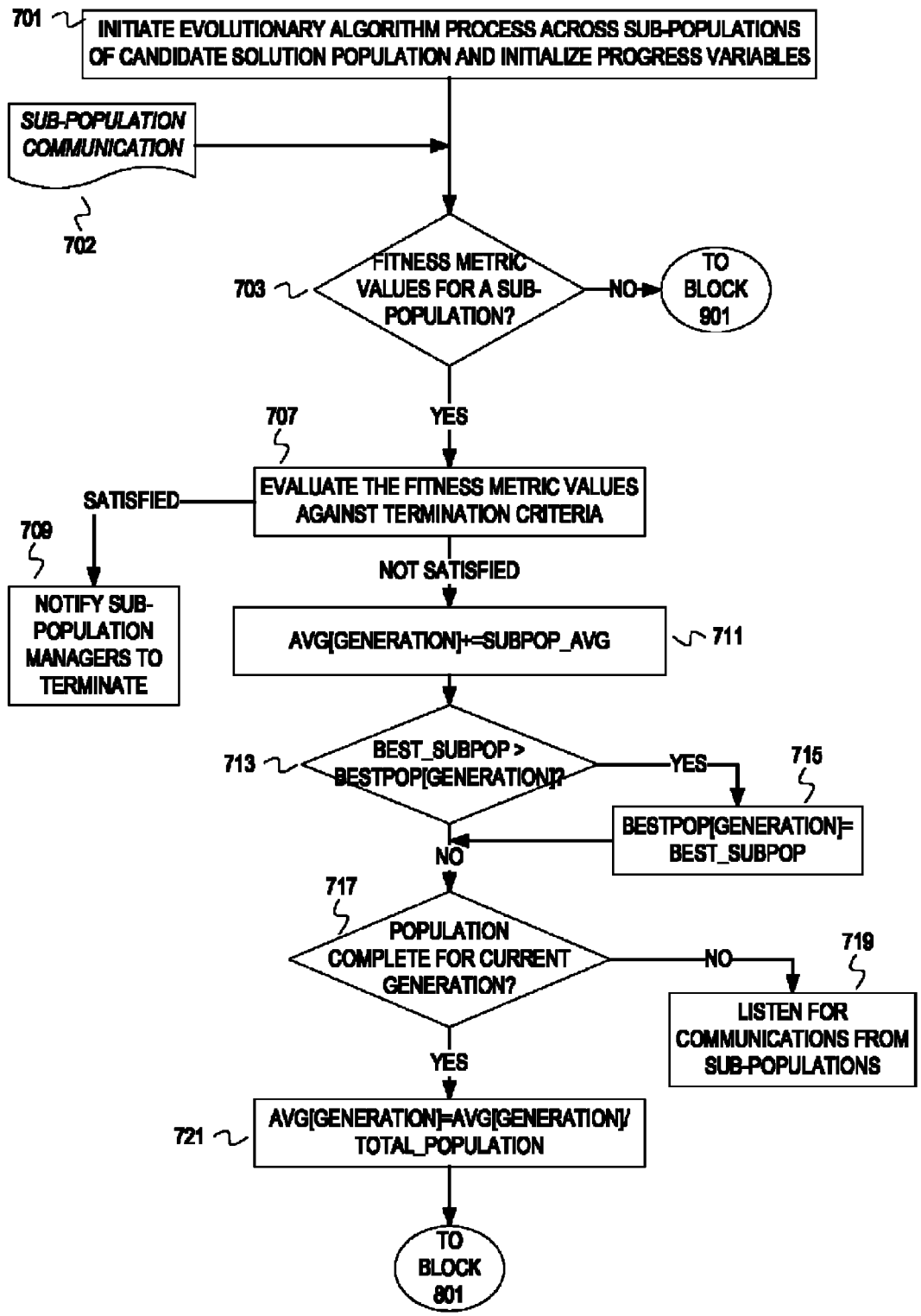
FIGS. 7-9 depict flowcharts of example operations for invoking a global catastrophe when average fitness and best fitness of a population do not progress.
Figure 8:
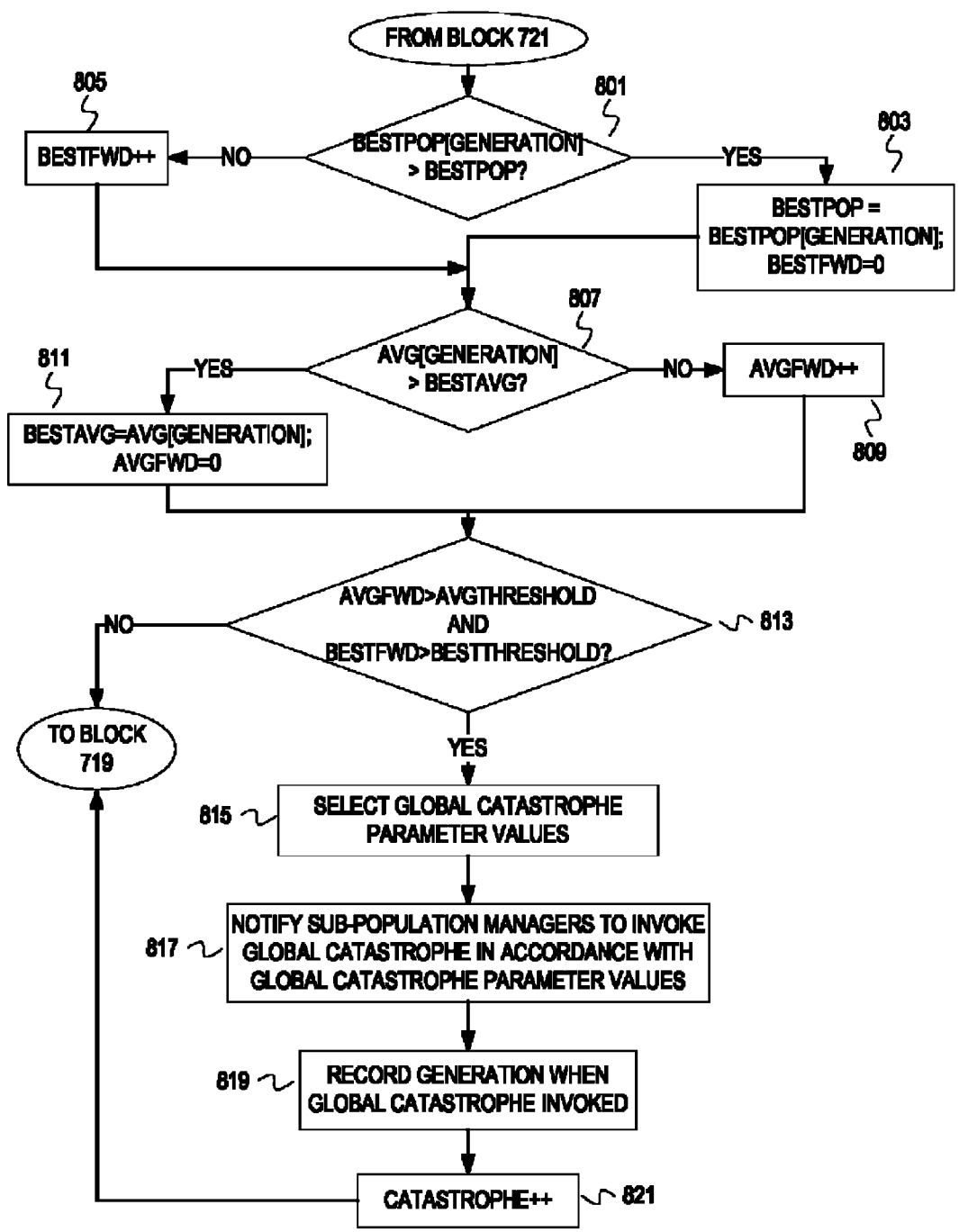
Figure 9:
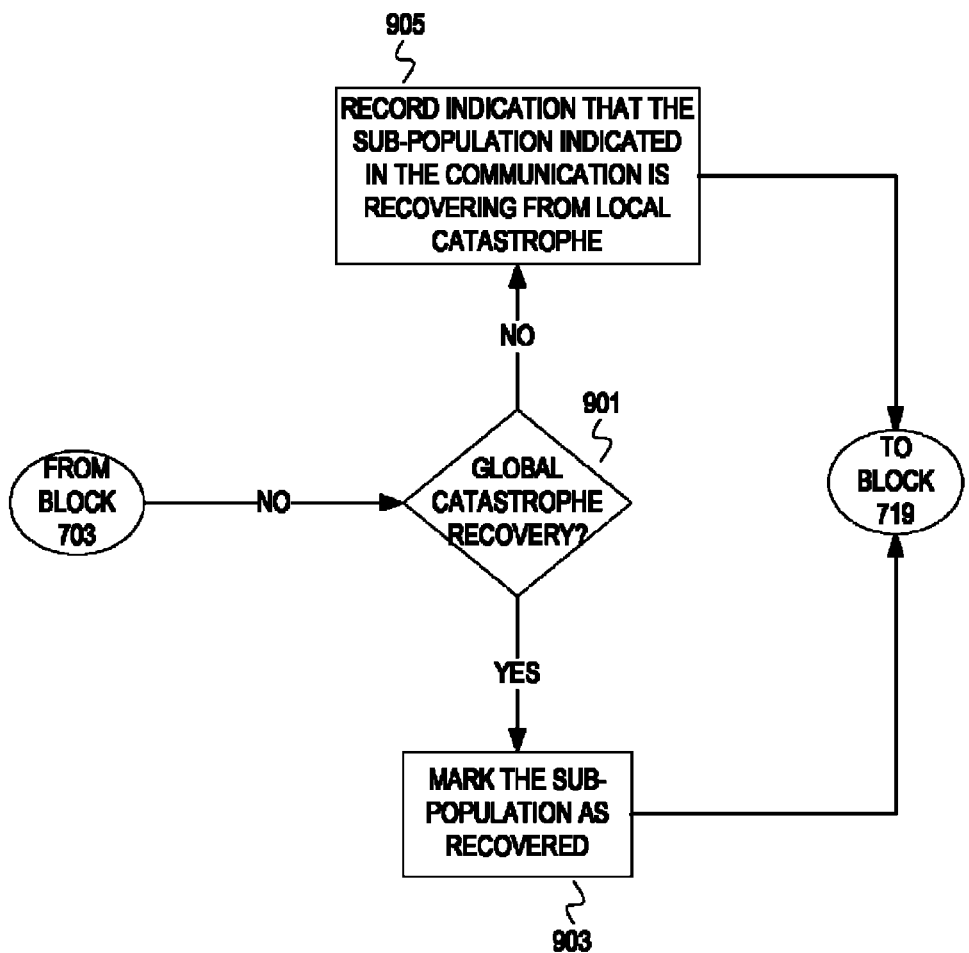

At block 317, the population manager notifies the sub-population managers or deme managers to invoke a global catastrophe. Embodiments can carry out the global catastrophe differently. In some embodiments, all of the deme managers invoke their local catastrophe procedures. In some embodiments, the local catastrophe procedure and the global catastrophe procedure are different procedures. For instance, a global catastrophe may not allow survivors, while the local catastrophe selects survivors. In addition, the deme managers recover from a global catastrophe with mutation instead of migration. Furthermore, the deme managers may invoke incongruous parts of a global catastrophe. For instance, the population manager may direct a particular deme manager to select a survivor while directing all other deme managers to mutate all candidate solutions. FIGS. 7-9 provide example operations that direct a global catastrophe with different parameters.

At block 319, the population manager records an indication that a global catastrophe was invoked. Control flows from block 319 to block 313.

Figure 4:
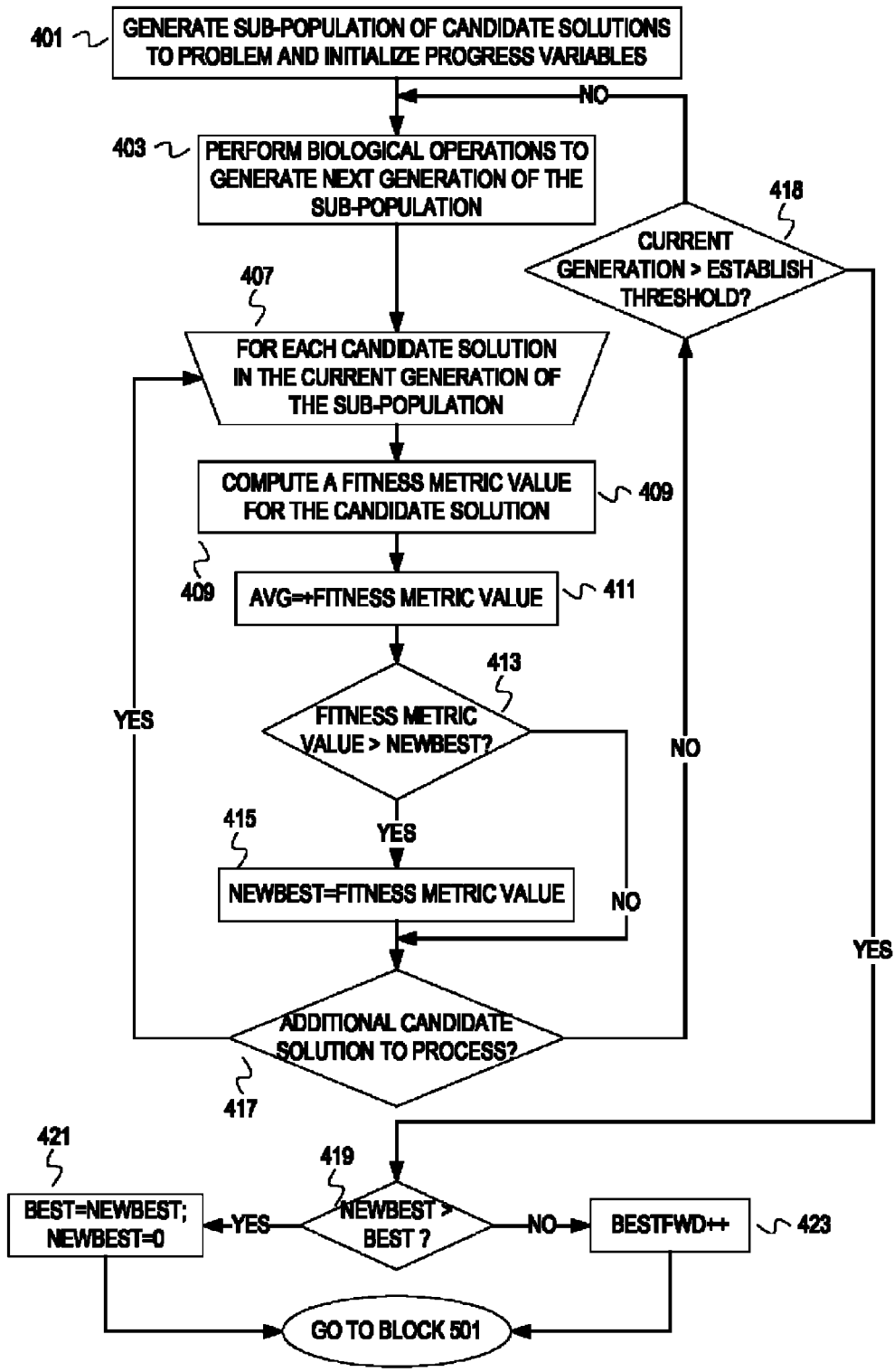
FIGS. 4-6 depict flowcharts of example operations for invoking a local catastrophe when average fitness and best fitness of a deme fail local forward progress criteria.
Figure 5:
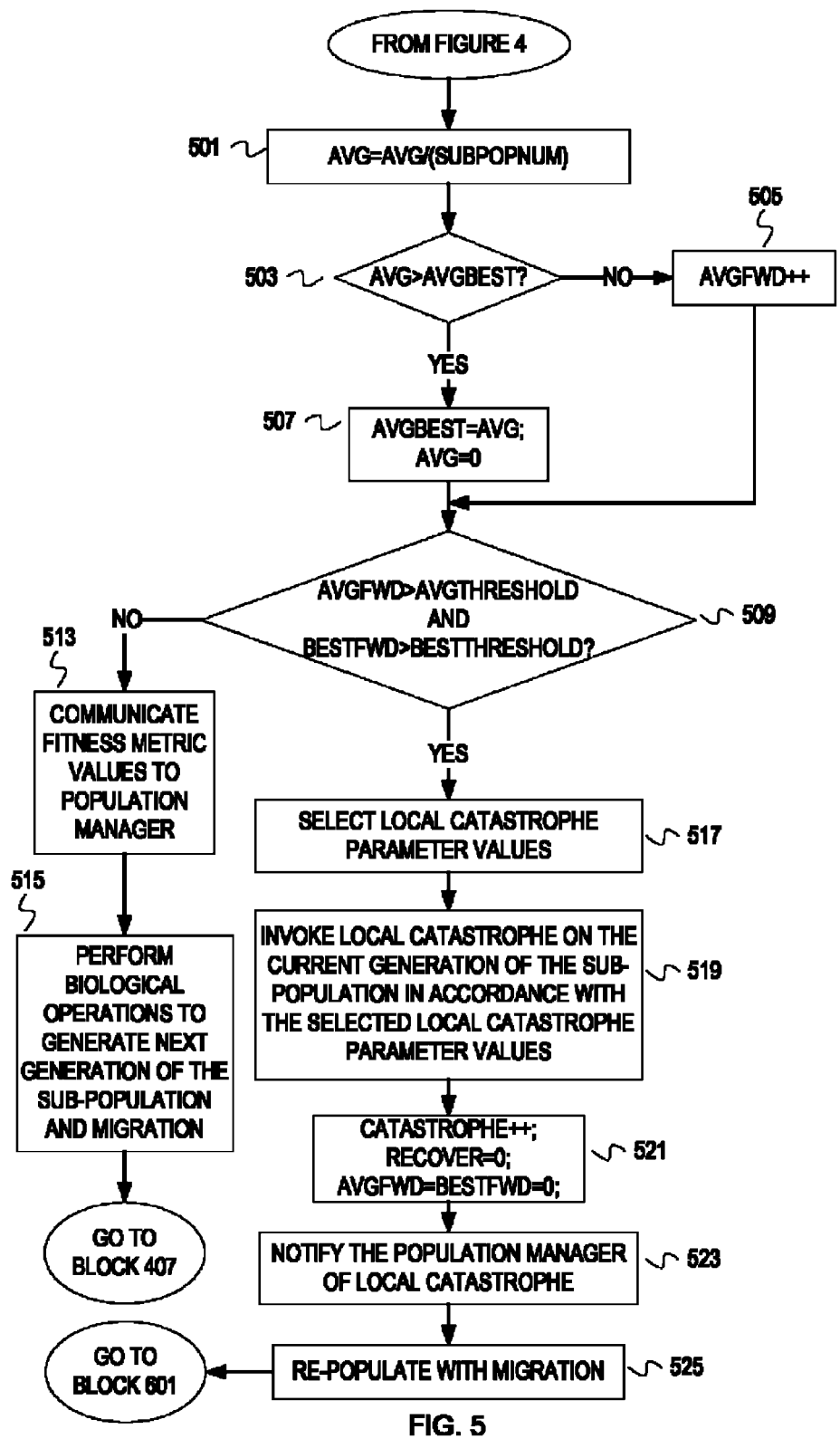
Figure 6:
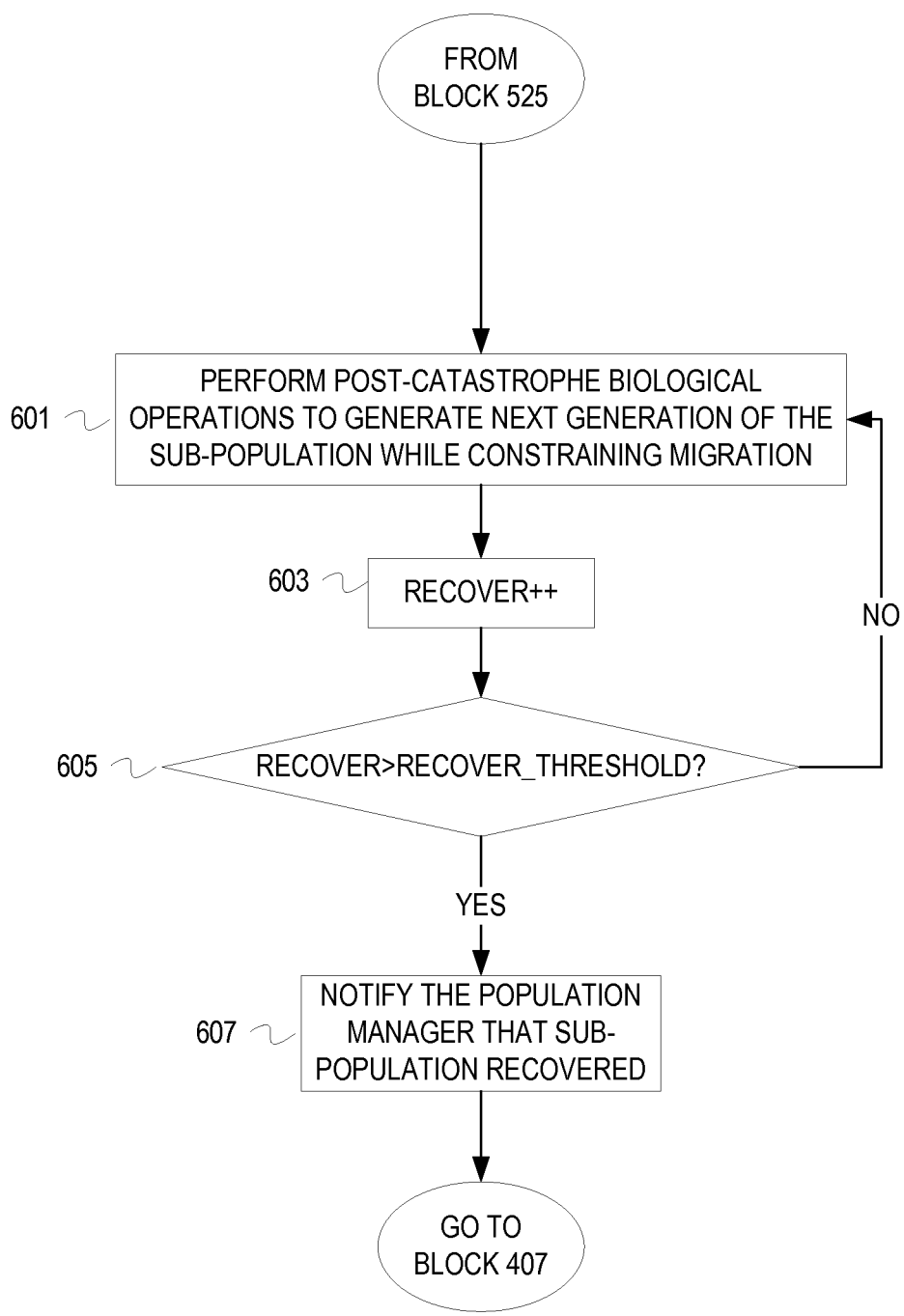

FIGS. 4-6 depict flowcharts of example operations for invoking a local catastrophe when average fitness and best fitness of a deme fail local forward progress criteria. The sub-population establishment operations in FIG. 4 are similar to those of FIG. 2. The example operations depicted at blocks 401, 403, and 405 in FIG. 4 presume an embodiment that does not compute fitness of the early sub-population generations. FIG. 4 refers to several variables that are used to track progress of a sub-population. These progress variables include AVG, BEST, NEWBEST, BESTFWD, AVGFWD, SUBPOPNUM, AVGBEST, CATASTROPHE, and RECOVER. The forward progress criteria include variables AVGTHRESHOLD and BESTTHRESHOLD. The variable AVG represents an average of the fitness metric values for a current sub-population generation. The variable NEWBEST represents a best fitness metric value of a current sub-population generation. The variable BEST represents a best fitness metric value across the sub-population generations. The variable AVGBEST represents the best of the averages of fitness metric values across sub-population generations. The variable BESTFWD represents a counter of sub-population generations that failed to provide a better most fit candidate solution than preceding sub-population generations. The variable AVGFWD represents a counter of sub-population generations that failed to provide an improved average of fitness metric values than preceding sub-population generations. The variable SUBPOPNUM represents a number of candidate solutions in the sub-population. The variable CATASTROPHE represents a counter of local catastrophes. The variable RECOVER is a counter used to count generations created after a local catastrophe. The variable AVGTHRESHOLD represents a threshold number of sub-population generations that fail to improve the average. The variable BESTTHRESHOLD represents a threshold number of sub-population generations that fail to improve the best fitness metric value. The forward progress criteria variables can be static or dynamic. For example, embodiments can adjust these thresholds to accommodate runs that result in infrequent, but large improvements across sub-population generations.

At block 401, a deme manager generates a sub-population of candidate solutions to an optimization problem and initializes the progress variables. The deme manager can generate this generation 0 sub-population of candidate solutions with randomly generated candidate solutions, seed candidate solutions, a combination of seed candidate solutions and randomly generated candidate solutions. In addition, a population manager can provide an initial sub-population generation, or even multiple early sub-population generations, to the deme manager.

At block 403, the deme manager performs biological operations to generate a next generation of the sub-population.

At block 407, a loop of operations begins for each candidate solution in the current sub-population generation. An initial candidate solution is selected from the sub-population. The loop in FIG. 4 includes the operations depicted in block 409, 411, 413, 415, and a loop termination test block 417.

At block 409, the deme manager computes a fitness metric value for the candidate solution. The deme manager stores the computed fitness metric value with an indication of the candidate solution and the generation.

At block 411, the deme manager adds the fitness metric value to AVG.

At block 413, the deme manager determines whether the fitness metric value is greater than NEWBEST. If the fitness metric value is greater than NEWBEST, then control flows to block 415. Otherwise, control flows to block 417.

At block 415, the deme manager sets NEWBEST to the fitness metric value.

At block 417, the deme manager determines whether there is an additional candidate solution in the current sub-population generation to process. If so, then control flows back to block 407 for selection of the next candidate solution. If not, then control flows to block 418.

At block 418, the deme manager determines whether the current sub-population generation exceeds a establish threshold. A threshold number of generations for establishing a sub-population can be configured. For instance, the deme manager determines whether 7 generations have been created, if the threshold has been configured as 7. In some embodiments, the establish threshold corresponds to fitness of the sub-population. For instance, the deme manager determines whether an average fitness of the sub-population and/or a best fitness metric value of the sub-population exceeds a fitness based establish threshold. In some embodiments, multiple establish threshold criteria can be employed (e.g., a fitness based establish threshold unless a generation reaches a generation based establish threshold ceiling). If the sub-population is not established, then control returns to block 403. If the sub-population is established, then control flows to block 419.

At block 419, the deme manager determines whether NEWBEST is greater than BEST. If NEWBEST is greater than BEST, then control flows to block 421. Otherwise, control flows to block 423.

At block 421, the deme manager sets BEST to NEWBEST and resets NEWBEST to 0 for the next sub-population generation.

At block 423, the deme manager increments BESTFWD to reflect the failure of this current sub-population generation to yield an improvement in the best fitness metric value.

Control flows from both blocks 421 and 423 to block 501 of FIG. 5.

FIG. 5 depicts a flowchart of example operations that continue from FIG. 4. At block 501, the deme manager computes the quotient of AVG and SUBPOPNUM, and sets AVG to the quotient.

At block 503, the deme manager determines whether AVG is greater than AVGBEST. If AVG is greater than AVGBEST, then control flows to block 507. Otherwise, control flows to block 505.

At block 505, the deme manager increments AVGFWD to reflect the failure of the current sub-population generation to yield an improvement in the average of the fitness metric values. Control flows from block 505 to block 509.

At block 507, the deme manager sets AVGBEST to AVG, and resets AVG to 0 for the next sub-population generation. Control flows from block 507 to block 509.

At block 509, the deme manager determines whether AVGFWD is greater than the AVGTHRESHOLD and whether BESTFWD is greater than BESTTHRESHOLD. If both thresholds are exceeded, then control flows to block 517. If at least one of the thresholds is not exceeded, then control flows to block 513. Embodiments are not limited to these thresholds for determining whether forward progress is made by a sub-population across generations. In addition, embodiments are not limited to counting failures across all generations until a local catastrophe is invoked. Embodiments can measure progress within intervals. For instance, forward progress is made if the improvements are made in the average and best in at least 3 generations of every 5 generations. In some embodiments, the threshold can adapt to age of the generation and/or magnitude of improvement. Embodiments can bias forward progress towards average or best. Embodiment may also track progress on one of average and best instead of both. A variety of tuning or configuration is possible for different optimization problems and different evolutionary algorithms, as well as for different computing resources.

At block 513, the deme manager communicates the fitness metric values of the sub-population generation to the population manager. The deme manager may write to a network location accessible/monitored by the population manager and/or transmit a message(s) that encodes the fitness metric values to the population manager. The deme manager also indicates the generation and the sub-population for the fitness metric values. Control flows from block 513 back to block 515.

At block 515, the deme manager performs biological operations to generate a next sub-population generation, and may also implement migration. In some embodiments, the deme manager waits for an indication to proceed from the population manager before creating the next generation. Control flows from block 515 back to block 407 of FIG. 4.

If the deme manager determined that the current sub-population generation failed to make forward progress at block 509, then the deme manager selects local catastrophe parameter values at block 517. The local catastrophe parameter values specify various attributes of the local catastrophe. In some embodiments, the local catastrophe parameter values comprise pointers to functions that carry out one or more aspects of a local catastrophe (e.g., survivor selection). Examples of the various attributes of the local catastrophe include number of survivors, criteria for a survivor, type of catastrophe (e.g., eliminating all candidate solutions except survivors, mutating all candidate solutions except survivors, etc.), and recovery process. As described earlier, the deme manager can adapt a local catastrophe to conditions of the population or sub-population. The deme manager selects the local catastrophe parameter values based on these conditions (e.g., magnitude of improvement, number of successive generations that fail forward progress, age of the generation, events in other sub-populations, global catastrophes, etc.).

At block 519, the deme manager invokes a local catastrophe on the current sub-population generation in accordance with the selected local catastrophe parameter values.

At block 521, the deme manager increments CATASTROPHE, sets RECOVER to 0, and sets both BESTFWD and AVGFWD to 0.

At block 523, the deme manager notifies the population manager of the local catastrophe.

At block 525, the deme manager re-populates with migration. In some embodiments, the deme manager may not re-populate with migration. For instance, the local catastrophe may have mutated the current sub-population generation instead of eliminating the candidate solutions. Control flows from block 525 to block 601.

FIG. 6 depicts a flowchart of example operations that continue from FIG. 5. At block 601, the deme manager performs post-catastrophe biological operations to generate a next generation of the sub-population while constraining migration.

At block 603, the deme manager increments RECOVER to reflect the completion of a post-catastrophe recovery generation. The deme manager can also use RECOVER to count recovery generations after a global catastrophe.

At block 605, the deme manager determines whether RECOVER is greater than RECOVER_THRESHOLD. The variable RECOVER_THRESHOLD specifies a number of generations for a sub-population to recover from a local catastrophe. The same or different threshold can be used for a global catastrophe. The RECOVER_THRESHOLD can be an approximation of the number of generations to constrain migration to avoid a migrant candidate solution from dominating the sub-population. If the recovery period has ended, then control flows to block 607. If the recovery period has not ended, then control flows back to block 601.

At block 607, the deme manager notifies the population manager that the sub-population has recovered from the local catastrophe. Control flows from block 607 to block 407.

FIGS. 7-9 depict flowcharts of example operations for invoking a global catastrophe when average fitness and best fitness of a population do not progress. FIG. 7 depicts a flowchart of example operations for invoking a global catastrophe when average fitness and best fitness of a population do not progress. The example operations depicted in FIG. 7 presume a population of candidate solutions are separated into sub-populations and distributed across multiple computing entities, similar to FIG. 3. With distributed sub-populations, a population manager tracks progress of the population (i.e., all of the sub-populations). FIG. 7 refers to several variables that are used to track progress of a population, similar to the variables used to track progress of a sub-population. These progress variables include AVG[ ], GENERATION, BEST_SUBPOP, SUBPOP_AVG, BESTPOP[ ], BESTFWD, AVGFWD, BESTAVG, and CATASTROPHE. The forward progress criteria include variables AVGTHRESHOLD BESTTHRESHOLD. The variable AVG[ ] represents an indexed structure (e.g., an array) of averages of the fitness metric values for each of the generations. The variable GENERATION identifies a generation, and is used to index into the indexed structures. The variable BESTPOP[ ] represents an indexed structure of best fitness metric values for each of the generations. The variable BEST_SUBPOP represents a best fitness metric value of a most fit candidate solution of a sub-population generation. The variable SUBPOP_AVG represents an average of the fitness metric values for a sub-population generation. The variable BESTAVG represents the best of the averages of fitness metric values across the generations. The variable BESTPOP represents the best fitness metric value across the generations. The variable BESTFWD represents a counter of generations that failed to provide a better most fit candidate solution than preceding generations. The variable AVGFWD represents a counter of generations that failed to provide an improved average of fitness metric values than preceding generations. The variable CATASTROPHE represents a counter of global catastrophes. The variable AVGTHRESHOLD represents a threshold number of generations that fail to improve the average. The variable BESTTHRESHOLD represents a threshold number of generations that fail to improve the best fitness metric value. The forward progress criteria variables can be static or dynamic. For example, embodiments can adjust these thresholds to accommodate runs that result in infrequent, but large improvements across generations.

At block 701, a population manager initiates an evolutionary algorithm process for a population across multiple computing entities managing different sub-populations of the population. The population manager also initializes population progress variables. At some point after initiating the process, the population manager receives a sub-population communication 702 from a deme manager.

At block 703, the population manager determines whether the sub-population communication 702 is reporting fitness metric values for a sub-population. If the communication 702 is not reporting fitness metric values, then control flows to block 901 of FIG. 9. If the communication 702 reports fitness metric values, then control flows to block 707.

At block 707, the population manager evaluates the fitness metric values against termination criteria. If the fitness metric values satisfy the termination criteria, then control flows to block 709. If the fitness metric values do not satisfy the termination criteria, then control flows to block 711.

At block 709, the population manager notifies the sub-population managers to terminate.

At block 711, the population manager adds SUBPOP_AVG, which is presumed to be encoded in the communication 702 from the corresponding deme manager, to AVG [GENERATION].

At block 713, the population manager determines whether BEST_SUBPOP is greater than BESTPOP[GENERATION]. If the best fitness metric value of the reporting sub-population is better than other previously reported sub-populations within the same generation, then control flows to block 715. Otherwise, control flows to block 717.

At block 715, the population manager sets BESTPOP [GENERATION] to BEST_SUBPOP. Control flows from block 715 to block 717.

At block 717, the population manager determines whether the population is complete for the generation indicated in the communication 702. In other words, the population manager determines whether all other sub-populations in generation N (assuming the communication 702 indicates generation N) have reported their fitness metric values. If the population for the generation indicated in the communication 702 is complete, then control flows to block 721. Otherwise, control flows to block 719.

At block 719, the population manager listens for communications from sub-populations (i.e., deme managers).

At block 721, the population manager compute a quotient of AVG[GENERATION] and TOTAL_POPULATION, and sets AVG[GENERATION] to the quotient. The variable TOTAL_POPULATION represents a number of candidate solutions in the population. Control flows from block 721 to block 801 of FIG. 8.

FIG. 8 depicts a flowchart of example operations that continue from block 721 of FIG. 7. At block 801, the population manager determines whether BESTPOP[GENERATION] is greater than BESTPOP. If the best fitness metric value for the generation identified by GENERATION is greater than previous generations, then control flows to block 803. Otherwise, control flows to block 805. In embodiments with asynchronous demes, the population manager will utilize one or more additional variables to accommodate the reporting of best fitness metrics and best averages from different generations. For instance, the population manager will avoid overwriting BESTPOP set from a best metric value in generation N with a BESTPOP[N−1].

At block 803, the population manager sets BESTPOP to BESTPOP[GENERATION], and resets BESTFWD to 0. Resetting BESTFWD to 0 assumes an embodiment that incurs global catastrophes when improvement or forward progress does not occur for successive generations. As described with reference to FIGS. 4-6, embodiments can condition global catastrophes on different conditions (e.g., windows of generations, magnitude of improvements over N generations, etc.). Control flows to block 807 from block 803. Some embodiments may maintain congruence between the local forward progress criteria and the global forward progress criteria.

At block 805, the population manager increments BESTFWD. Control flows from block 805 to block to block 807.

At block 807, the population manager determines whether AVG[GENERATION] is greater than BESTAVG. If AVG[GENERATION] is greater than BESTAVG, then control flows to block 811. Otherwise, control flows to block 809.

At block 809, the population manager increments AVGFWD. Control flows from block 809 to block 813.

At block 811, the population manger sets BESTAVG to AVG[GENERATION] and rests AVGFWD to 0. Control flows from block 811 to block 813.

At block 813, the population manager determines whether AVGFWD is greater than the AVGTHRESHOLD and whether BESTFWD is greater than BESTTHRESHOLD. If both thresholds are exceeded, then control flows to block 815. If at least one of the thresholds is not exceeded, then control flows to block 719 of FIG. 7. Embodiments are not limited to these thresholds for determining whether forward progress is made by a sub-population across generations. In addition, embodiments are not limited to counting failures across all generations until a global catastrophe is invoked. Embodiments can measure progress within intervals. For instance, forward progress is made if the improvements are made in the average and best in at least 3 generations of every 5 generations. In some embodiments, the threshold can adapt to age of the generation and/or magnitude of improvement. Embodiments can bias forward progress towards average or best. Embodiment may also track progress on one of average and best instead of both, or stack a magnitude of improvement criteria (e.g., 10% improvement every 3 generations) on top the other forward progress criteria. A variety of tuning or configuration is possible for different optimization problems and different evolutionary algorithms, as well as for different computing resources.

At block 815, the population manager selects global catastrophe parameter values. The global catastrophe parameter values specify various attributes of the global catastrophe. In some embodiments, the global catastrophe parameter values comprise pointers to functions that for to be called by the deme managers. The global catastrophe parameter values can influence catastrophe attributes similar to those of a local catastrophe. In addition, the global catastrophe parameter values can vary across deme managers. The population manager select global catastrophe parameter values that cause a deme manager to eliminate all but one candidate solution and bias migration from a particular sub-population. The global catastrophe parameter values may designate different degrees of mutation for the different deme managers. In addition, the global catastrophe parameter values can indicate a number of generations for recovery from the global catastrophe.

At block 817, the population manager notifies the deme or sub-population manager to invoke a global catastrophe in accordance with the selected global catastrophe parameter values, which may be different across the sub-population managers.

At block 819, the population manager records the generation when the global catastrophe was invoked. The recordings can be used in subsequent analysis of the evolutionary computing.

At block 821, the population manager increments CATASTROPHE. The population manager may be limited to a certain number of global catastrophes. In addition, the number of global catastrophe can influence selection of modification of global catastrophe parameters. Control flows from block 821 back to block 719 of FIG. 7.

If the communication 702 was not reporting fitness metric values for a sub-population, then control flowed to block 901 of FIG. 9 from block 703. FIG. 9 depicts a flowchart of example operations that continue from FIG. 7. At block 901, the population manager determines whether the communication 702 indicates that a sub-population has recovered from a global catastrophe. If not, then control flows to block 905. If the communication 702 indicates recovery of a sub-population from a global catastrophe, then control flows to block 903.

At block 903, the population manager marks the sub-population as recovered from the global catastrophe and control returns to block 719.

If the communication 702 did not report fitness metric values and did not report recovery from a global catastrophe, then the communication indicates recovery from a local catastrophe. A population manager may receive other communications (e.g., keep alive messages), but those message are not described to avoid obfuscating this description. At block 905, the population manager records an indication that the sub-population indicated in the communication 702 is recovering from a local catastrophe. If a deme manager does not report fitness metric values during recovery from a local catastrophe, the deme manager may still send messages at each generation during recovery for the population manager to track progress of the sub-population. Control flows from block 905 back to block 719 of FIG. 7.

It should be appreciated that the flowcharts are provided as examples to aid in understanding the inventive subject matter, and are not to be used to limit embodiments or the scope of the claims. In addition to the variations previously described, embodiments can perform different operations than those depicted herein, additional operations not depicted herein, fewer operations than those depicted herein, the depicted operations in a different order, at least some of the depicted operations in parallel, etc.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
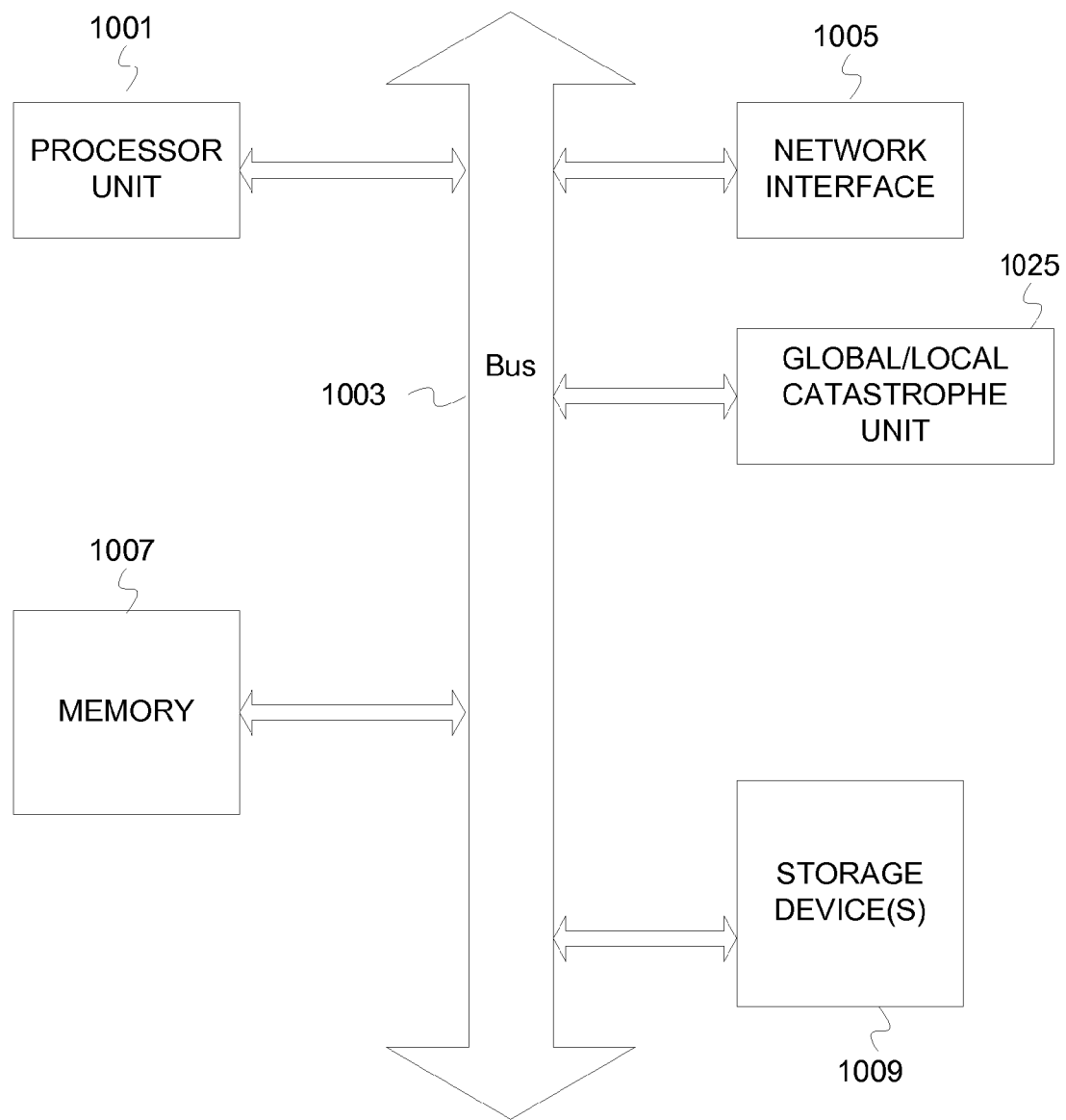
FIG. 10 depicts an example computer system with a global/local catastrophe unit.

FIG. 10 depicts an example computer system with a global/local catastrophe unit. A computer system includes a processor unit 1001 (e.g., a chip with multiple processors, multiple cores, multiple nodes, and/or a chip implementing multithreading, etc.). The computer system includes memory 1007. The memory 1007 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1003 (e.g., PCI, ISA, PCI-Express, HyperTransport® bus, InfiniBand® bus, NuBus, etc.), a network interface 1005 (e.g., an ATM interface, an Ethernet interface, a Frame Relay interface, SONET interface, wireless interface, etc.), and a storage device(s) 1009 (e.g., optical storage, magnetic storage, etc.). The example computer system also comprises a global/local catastrophe unit 1025. The global/local catastrophe unit 1025 can be associated with a population manager or a deme manager. If associated with a population manager, the global/local catastrophe unit tracks local catastrophes across sub-populations, tracks forward progress of a population, and invokes a global catastrophe when the population fails to satisfy global forward progress criteria. If the unit 1025 is associated with a deme manager, then the global/local catastrophe unit 1025 tracks forward progress of a sub-population, invokes a local catastrophe when a sub-population generation fails to satisfy local forward progress criteria, recover from local catastrophes and global catastrophes, and applies a global catastrophe to a corresponding sub-population. Any one of these functionalities may be partially (or entirely) implemented in hardware and/or on the processing unit 1001. For example, the functionality may be implemented with an application specific integrated circuit, in logic implemented in the processing unit 1001, in a co-processor on a peripheral device or card, etc. Further, realizations may include fewer or additional components not illustrated in FIG. 10 (e.g., video cards, audio cards, additional network interfaces, peripheral devices, etc.). The processor unit 1001, the storage device(s) 1009, and the network interface 1005 are coupled to the bus 1003. Although illustrated as being coupled to the bus 1003, the memory 1007 may be coupled to the processor unit 1001.

While the embodiments are described with reference to various implementations and exploitations, it will be understood that these embodiments are illustrative and that the scope of the inventive subject matter is not limited to them. In general, techniques for using global and local catastrophes as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for invoking a global catastrophe on a population in a parallel evolutionary algorithm computing process, the computer program product comprising:
   a computer readable storage medium having computer usable program code embodied therewith, the computer usable program code comprising a computer usable program code configured to:
   track forward progress of a population of candidate solutions across generations thereof, wherein the population is divided into a plurality of sub-populations across a plurality of computing entities that iteratively create new generations of the plurality of sub-populations of candidate solutions in search of a solution to an optimization problem;
   track local catastrophes invoked on the plurality of sub-populations by respective ones of the plurality of computing entities;
   at a current generation of the population, determine that forward progress of the population fails a set of one or more forward progress criteria;
   in response to a determination that the forward progress of the population fails the set of one or more forward progress criteria at the current generation,
      select parameter values that influence the global catastrophe, wherein the selection is based, at least in part, on the tracked local catastrophes invoked on the plurality of sub-populations,
      command the plurality of computing entities to collectively apply the global catastrophe to the plurality of sub-populations in accordance with the parameter values.

2. The computer program product of claim 1, wherein the parameter values that influence the global catastrophe are different for at least one of the plurality of computing entities.

3. The computer program product of claim 1, wherein the parameter values that influence the global catastrophe indicate at least one of degree of mutation, number of survivors, and number of generations to recover.

4. The computer program product of claim 1, wherein the computer usable program code is further configured to postpone the global catastrophe until after a first of the plurality of sub-populations recovers from a local catastrophe invoked on the first sub-population by the computing entity corresponding to the first sub-population.

5. A computer program product for invoking a local catastrophe on a sub-population in a parallel evolutionary algorithm computing process, the computer program product comprising:
   a computer readable storage medium having computer usable program code embodied therewith, the computer usable program code comprising a computer usable program code configured to:
   track forward progress of a first sub-population across generations thereof, wherein the first sub-population is one of a plurality of sub-populations that form a population of candidate solutions to an optimization problem for which a solution is being searched by a parallel evolutionary computing process;
   at a current generation of the first sub-population, determine that forward progress of the first sub-population fails a set of one or more forward progress criteria;
   in response to a determination that the forward progress of the first sub-population fails the set of one or more forward progress criteria at the current generation, invoke a local catastrophe on the current generation of the first sub-population;
   re-populate the first sub-population after the local catastrophe is invoked; and
   constrain migration to the first sub-population while re-establishing the first sub-population after re-population.

6. The computer program product of claim 5, wherein the forward progress corresponds to improvement in at least one of a best fitness metric value of the first sub-population and average of the fitness metric values for the first sub-population across generations of the first sub-population.

7. The computer program product of claim 6, wherein the computer usable program code configured to track forward progress of the first sub-population across generations thereof comprises the computer usable program code configured to track a number of generations of the first sub-population that fail to improve at least one of the best fitness metric value and the average of the fitness metric values for the first sub-population.

8. The computer program product of claim 5, wherein the computer usable program code configured to determine that forward progress of the first sub-population fails the set of one or more forward progress criteria at the current generation comprises the computer usable program code configured to determine that an aggregate of the current generation and a plurality of predecessor generations of the first sub-population that have failed to make forward progress exceeds a threshold number of generations for failing to make forward progress.

9. The computer program product of claim 5, wherein the computer usable program code configured to re-populate the first sub-population after the local catastrophe comprises the computer usable program code configured to perform migration of candidate solutions from others of the plurality of sub-populations.

10. The computer program product of claim 5, wherein the computer usable program code configured to constrain migration to the first sub-population while re-establishing the first sub-population after re-population comprises the computer usable program code configured to, while iteratively generating successive generations of the first sub-population with candidate solutions from said re-population, one of:

prevent, for at least some of the successive generations of the first sub-population, migration of candidate solutions into the first sub-population; and limit migration of candidate solutions into the first sub-population.

11. An apparatus for invoking a local catastrophe on a sub-population in a parallel evolutionary algorithm computing process comprising:

a processor;

a network interface operable to communicate at least fitness metric values;

a local catastrophe unit operable to, track forward progress of a first sub-population across generations thereof, wherein the first sub-population is one of a plurality of sub-populations that form a population of candidate solutions to an optimization problem for which a solution is being searched by a parallel evolutionary computing process;

at a current generation of the first sub-population, determine that forward progress of the first sub-population fails a set of one or more forward progress criteria;

in response to a determination that the forward progress of the first sub-population fails the set of one or more forward progress criteria at the current generation, invoke a local catastrophe on the current generation of the first sub-population;

re-populate the first sub-population after the local catastrophe is invoked; and constrain migration to the first sub-population while re-establishing the first sub-population after re-population.

12. The apparatus of claim 11 further comprising a machine-readable storage media having program instructions stored thereon, wherein the program instruction embody the local catastrophe unit.

13. The apparatus of claim 11, wherein the local catastrophe unit being operable to constrain migration to the first sub-population while re-establishing the first sub-population after re-population comprises the local catastrophe unit operable to, while iteratively generating successive generations of the first sub-population with candidate solutions from said re-population, one of:

prevent, for at least some of the successive generations of the first sub-population, migration of candidate solutions into the first sub-population; and limit migration of candidate solutions into the first sub-population.

* * * * *